Dec. 26, 1933.                M. S. RANDALL                1,940,969
                                WALL PANEL
                            Filed Oct. 6, 1928
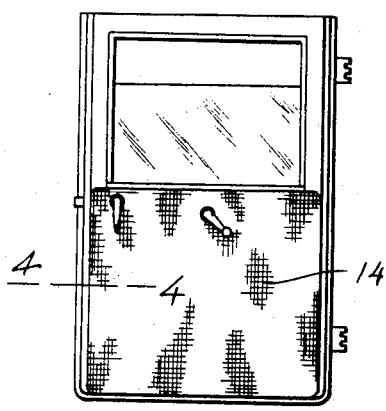
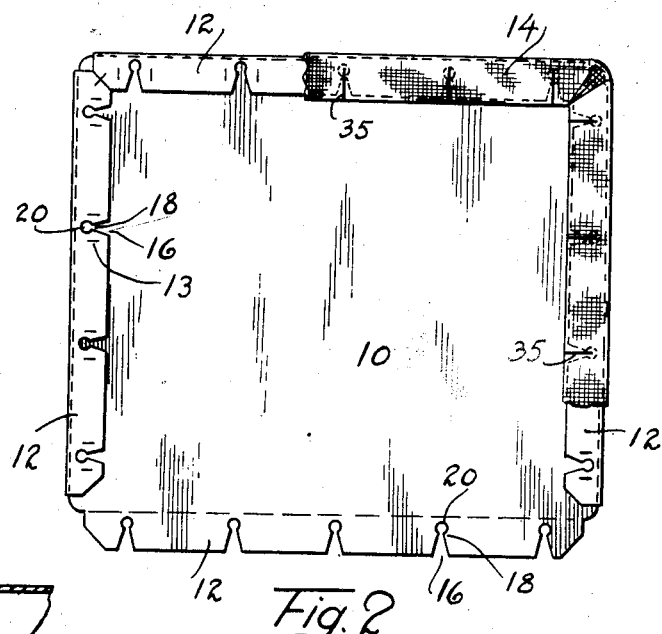
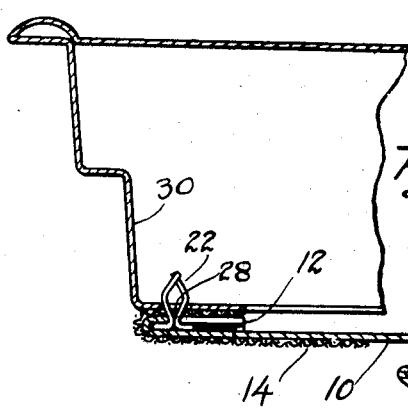
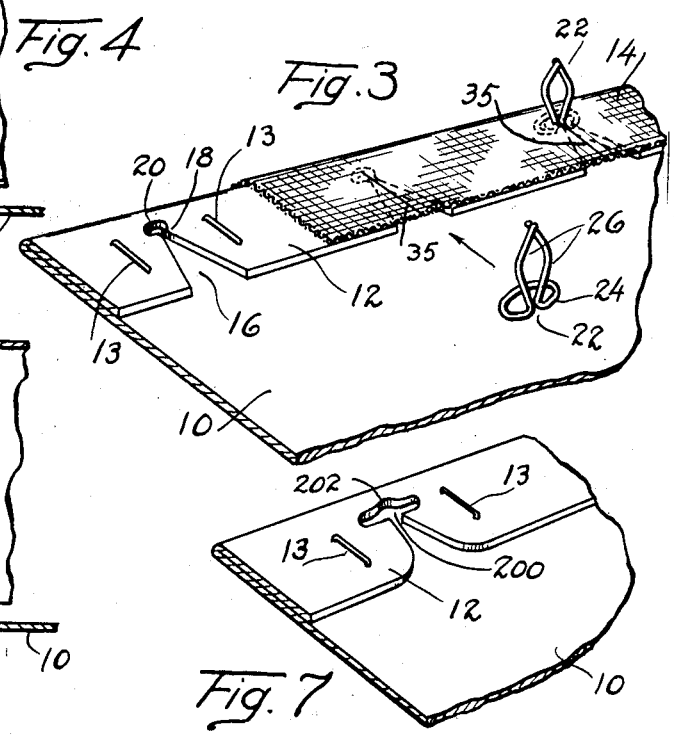
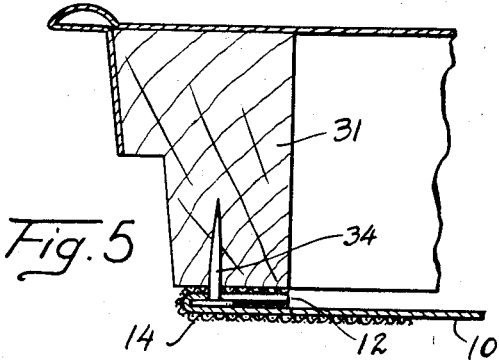
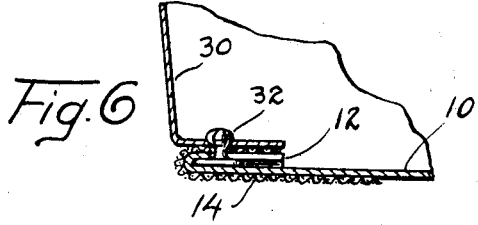
INVENTOR.
Meredith S. Randall
BY
Parker & Burton
ATTORNEYS Patented Dec. 26, 1933

1,940,969

UNITED STATES PATENT OFFICE 1,940,969

WALL PANEL

Meredith S. Randall, Detroit, Mich., assignor, by direct and mesne assignments, to Woodall Industries Incorporated, Detroit, Mich., a corporation of Michigan Application October 6, 1928. Serial No. 310,681

4 Claims. (Cl. 45—138)

My invention relates to improvements in wall panels and particularly to an interior wall panel for an automobile body.

An important consideration in the provision of an interior wall panel of the type described is to provide a panel which may be readily attached to the supporting frame with the minimum amount of labor and which when attached is securely held in place upon the frame. It is also important that the panel be so constructed that the securing means employed in attaching it to the frame be concealed and so disposed as not to come loose due to jar and shock imposed upon the body carrying the panel.

Automobile body panels are fastened in place by relatively unskilled labor and it is necessary that the means employed be simple and easily applied and be adaptable to ready application so that the production line will not be delayed.

It is common practice to ship various parts of automobile bodies to designated assembly points and it is therefore desirable that the panels be so formed as to be readily handled and to lie flat when shipped and this is facilitated if the panels are so constructed that the fastener is not attached thereto until the panel is to be placed upon the frame.

My improved panel is adapted to meet the various objects above set forth; it is inexpensive as to price; it is sturdy in construction; it is so formed as to readily receive conventional fasteners without the employment of inserting mechanism or tools; it is adapted to grip the fasteners upon their insertion therein and to support them for attachment to the supporting frame of the body; it is so constructed that the fasteners are concealed when in place and the panel is held snugly thereby to the frame upon which it is mounted.

Other objects and meritorious features of my invention will more fully appear from the following description, appended claims and accompanying drawing, wherein—

Fig. 1 is an elevation of an automobile door provided with a panel embodying my invention.

Fig. 2 is an elevation of a panel, from the rear, removed from the door with a portion of its marginal fold unfolded.

Fig. 3 is a perspective of a fragment of a panel showing conventional securing devices inserted and adapted to be inserted in place thereon.

Fig. 4 is a cross-sectional view taken on line 4—4 of Fig. 1.

Fig. 5 is a cross-sectional view taken on a line similar to that of Fig. 4 through a composite door having a wood frame to which the panel is secured by a tack.

Fig. 6 is a cross-sectional view of a fragment of the panel and frame showing a modified form of fastener.

Fig. 7 is a perspective of a fragment of a panel showing a modified form of fastener receiving aperture.

In the drawing I have shown my improved panel as secured to an automobile door below the window opening, though obviously it might be used in other places. In Figs. 1 and 4 I have shown an automobile door of the all metal type which is familiar construction and in Fig. 5 I have shown a fragment of the door of the composite type which includes a wood frame member.

My improved panel may be formed of cardboard and in Fig. 2 I have shown such a panel, which is indicated generally by the reference numeral 10, as having concealed fastener carrying marginal portions which are shown as marginal folds or flanges 12 folded over upon the reverse side of the panel, and the upholstering material 14, which covers the exposed side of the panel, as extended over these folds so as to secure the same in place upon the panel and conceal the edges thereof.

The marginal folds 12 are provided at intervals with apertures 16 which extend from the edge of the fold outwardly toward a margin of the panel. These apertures are preferably formed so as to have an enlarged mouth at the edge of the fold so as to readily receive a fastener within the aperture; a restriction 18 spaced from said mouth and an enlargement 20 at the outer extremity in proximity to the margin of the panel, which enlargement is adapted to receive the fastener after it has passed through the restricted neck which serves to hold the fastener in place within the enlargement. This construction is clearly shown in Fig. 3.

The fastener carrying portion or fold 12 is so secured to the panel that that portion thereof adjacent to the margin of the enlargement 20 is normally tensioned toward the panel so that a fastener inserted therein is held grippingly toward the panel between the fold and the panel and though adjustable within the enlargement is normally held at any position to which it may be adjusted.

I have here shown the fastener carrying portion 12 as being integral with the panel and formed by a marginal fold thereof and this fold is fastened down upon the panel by suitable fastening means such as staples 13 which are arranged in proximity to the fastener receiving apertures 16 heretofore described so as to tension that portion of the fold surrounding the margin of the aperture toward the panel to grippingly engage the head of the fastener received therebetween.

Any suitable type of fastener may be used. In Figs. 3 and 4 I have shown a spring wire fastener 22 of conventional form which has a flat head 24 that is received underneath the fold and held between the fold and the panel to secure the fastener in place upon the panel, and a pair of prongs 26 which are received through an aperture 28 formed in the supporting frame member 30 of the body. This construction is such that the normal tension of the fastener holds the panel securely upon the frame body.

Instead of the fastener shown in Fig. 3, other well known types of fasteners might be used such as the glove type of fastener, indicated generally as 32 and illustrated in Fig. 6 wherein the head of the fastener is inserted in the same manner as above described underneath the fold 12 of the panel 10 and the shank of the fastener is inserted into a provided aperture in the frame member 30. A fastener such as a nail or tack 34 might be used and the head thereof inserted as described underneath the fold 12 and the tack then driven into the wood frame member 31.

Whatever type of fastener is employed it is apparent that it may be readily inserted into the provided aperture without the use of any special tool for the purpose. The fabric upholstering may be simply slitted as at 35 as it is sufficiently flexible to receive and accommodate for the reception of the fastener in the aperture 16.

Apertures shaped somewhat differently from that shown in Figs. 2 and 3 might be used, and in Fig. 7 I have shown an aperture having an enlargement 200 which is elongated on a line parallel to the margin of the panel and is slightly enlarged at a point 202 intermediate its ends so so to provide for adjustment of the fastener therein to accommodate for any variation in the apertures 28 in the frame.

Panels of this type may be shipped stacked flat, one upon the other, and at the point of assembly upon the car body the fasteners may be readily inserted and the panel then applied to the frame. It is apparent that the fasteners upon insertion in the provided apertures will be held securely at the position to which they are adjusted therein so as to be carried by the panel to be applied to its support and that once the panel is applied it will be securely held upon the support or even though the fastener might be so turned as to be movable through the neck or restriction of the aperture it is obvious that this would not occur in use with all the fasteners upon the job in such a fashion as to permit the panel to come loose and the rotation of one or more of the fasteners in use would not have any effect as they could not come out of place.

What I claim is:

1. A trim panel having a marginal flange extending along its rear face, connecting means arranged at intervals along the length of said flange tensioning the flange toward the body of the panel, and a fastener having a headed portion removably received between a pair of connecting means underneath said flange and resistingly adjustable thereunder between said connecting means but held by the tension of the flange at adjusted positions against accidental displacement.

2. A trim panel having a marginal flange extending along its rear face connected to the body of the panel at spaced apart points along its length by fastening means tensioning that portion of the flange between two adjacent fastening means toward the body of the panel, and a fastener having a headed portion movably received underneath said flange between a pair of adjacent fastening means and held by the tension of the flange against the body of the panel against accidental relative displacement but resistingly adjustable within limits underneath the flange between said fastening means.

3. A trim panel having a marginal flange extending along its rear face and provided with apertures arranged at intervals along the length of the flange, each aperture extending from the edge of the flange toward the margin of the panel, connecting means arranged at intervals along the length of the flange between said apertures and tensioning the flange about the margins of the apertures toward the body of the panel, and a fastener having a headed portion and a shank portion, the headed portion of the fastener removably receivable underneath said flange with the shank portion removably receivable within the aperture, the headed portion being held by the tension of the flange toward the body portion of the panel against accidental displacement but resistingly adjustable underneath the flange within the limits of movement of the shank portion of the fastener within the aperture.

4. A trim panel having a marginal fold provided at spaced apart intervals with fastener receiving apertures therethrough and tensioned at spaced apart intervals between the apertures and adjacent to the margin thereof to the body of the panel.

MEREDITH S. RANDALL.